United States Patent Office 2,830,972
Patented Apr. 15, 1958

2,830,972

ORGANIC POLYMERS AND THEIR PREPARATION

Comer Drake Shacklett, Roselle, N. J., asisgnor to E. I. du Pont de Nemours and Company, Wilmington, Del., a corporation of Delaware No Drawing. Application March 9, 1954
Serial No. 415,162

12 Claims. (Cl. 260—80.3)

This invention pertains to organic polymers and to their preparation. More particularly it pertains to addition polymers of high molecular weight which contain extralinear amide groups. Still more particularly it pertains to such polymers wherein unsubstituted- as well as dihydroxy-alkane-substituted amide groups are present. The invention further relates to such polymers which can be gelled or cross-linked to produce water-permeable colloids.

Various water-soluble synthetic polymers are known to be useful as gelatin substitutes and for admixture with gelatin. Among these polymers are those which contain intralinear as well as extralinear amide groups. The known polymers while possessing various advantages also have some disadvantages. Among the disadvantages is the difficulty of rapidly converting their water solutions into gels. A further disadvantage of certain of them is that they do not have reversible gelling characteristics. Other disadvantages are the cost of the chemical compounds from which they are made, and the fact that they do not lend themselves readily to the making of high speed emulsions.

An object of this invention is to provide a new class of organic polymers. Another object is to provide polymers which can be used to produce firm, strong, but freely water-permeable gels. Yet another object is to provide such polymers which can be chemically modified in a simple manner to yield gels which can be converted to the ungelled original state, re-gelled and re-converted, all very quickly. A further object is to provide such polymers which do not depend on temperature to control their gelling or setting properties. A still further object is to provide such polymers which can be used to replace gelatin and other reversible colloids in light-sensitive silver halide dispersion layers of photographic elements. Still other objects will be apparent from the following description.

The above objects are accomplished in accordance with the present invention by copolymerizing, at room temperature or above and preferably at 40 to 70° C., for a period of 1 to 50 hours, (1) an ethylenically unsaturated amide taken from the group consisting of (a) those which have the general formula:

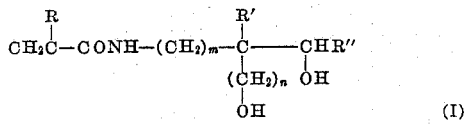
(I)

wherein R is a member taken from the group consisting of hydrogen, alkyl of 1 to 3 carbon atoms, phenyl and cyclohexyl, R' is a member taken from the group consisting of hydrogen and alkyl of 1 to 3 carbon atoms, R'' is a member taken from the group consisting of hydrogen and alkyl of 1 to 3 carbon atoms, $m$ is a carinal number from 0 to 4, and $n$ is a cardinal number from 0 to 1; and further characterized in that the NH group and any hydroxyl groups are spaced by at least two carbon atoms and (b) the hydrolyzable acetal derivatives of the dihydroxy compounds of Formula I which yield the latter compounds on hydrolysis, in which suitable alkyl radicals include methyl, ethyl, propyl, and isopropyl, and suitable radicals for $(CH_2)_m$ include methylene, bimethylene, trimethylene, and tetramethylene, when $m$ is a positive interger, and (2) an ethylenically unsaturated amide of the general formula:

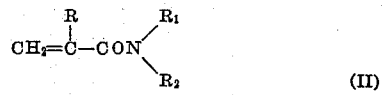
(II)

where R, $R_1$ and $R_2$ are members taken from the group consisting of hydrogen, alkyl of 1 to 3 carbon atoms, phenyl and cyclohexyl, in which suitable alkyl radicals include methyl, ethyl, propyl, and isopropyl. When copolymers are prepared from acetal compounds (b), the acetal-containing copolymers are hydrolyzed to yield the dihydroxyalkyl-containing units corresponding to Formula I.

One, two or more of compounds (1) may be copolymerized with one, two or more of compounds (2) to form two or more component copolymers. The final copolymers may contain recurring intralinear units of the formulae:

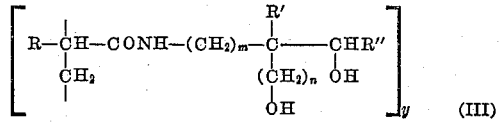
(III)

and

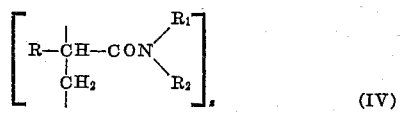
(IV)

wherein the various radicals R and $m$ and $n$ have the same significance as in Formulae I and II, and $y$ and $z$ represent the number of units in the copolymer molecules.

When two different monomers of type (a) or (b) are used with one monomer of Formula II, after hydrolysis of the acetal group, two different units having general Formula III will be present. Similarly, when two different monomers of Formula II are used with one monomer to type (a) or (b), after hydrolysis of the acetal group, two different units of Formula IV will be present. When two or more of each type of monomer is present the chain of polymer will contain four, or more, recurring units of the above formulae.

The reactants (1) and (2) are copolymerized in the proportions of 10 to 70 mole percent of the former to 90 to 30 mole percent of the latter. The polymerization is preferably carried out in the presence of a suitable solvent or diluent, e. g., water or mixtures of water with water-miscible solvents, e. g., methanol, ethanol, propanol, isopropyl alcohol and tertiary-butyl alcohol, and may be accelerated by heat, actinic light of wave-lengths between 1800 and 7000 A. U.; and/or an addition polymerization initiator, e. g., an organic or inorganic peroxide, an alkali metal or ammonium persulfate, an azonitrile, or an azoamidine hydrochloride. The polymerization preferably is carried out at 40° C. to 70° C., since polymers of especially useful molecular weight can be obtained within these ranges. At higher temperatures lower molecular weight polymers are formed and at lower temperatures higher molecular weight polymers are formed.

Various concentrations of monomers may be present in the solvent medium and concentrations from ½ to 2 molar are preferred. It has been found that an increase in monomer concentration results in copolymers of higher molecular weight, while a decrease in polymer concentration results in copolymers of lower molecular weight.

It will be apparent from the above that by varying the concentration of monomers, the ratio of water and water-soluble solvent, the temperature, and the concentration of polymerization initiator, there may be obtained copolymers of different molecular weights and viscosities. By a suitable choice of conditions, there may be obtained copolymers of any desired molecular weight.

After the copolymerization reaction is complete the resulting viscous solution is treated with a water-miscible, non-solvent for the polymer, e. g., acetone, methyl ethyl ketone, methanol, ethanol, or dioxane, which treatment precipitates or coagulates the polymer in the form of a white solid which may be broken up, reduced or ground to smaller sizes, washed and dried. In the case where the acetals of the compounds of Formula I are used, it is preferable to hydrolyze the polymeric acetals converting the extralinear acetal groups into extralinear glycol groups before precipitation of the polymer with a water-miscible, non-solvent therefore. This hydrolysis may be accomplished by admixing with the solution of the copolymer a sufficient quantity of a strong organic or inorganic acid, e. g., sulfuric, hydrochloric, trichloro-acetic, etc., to maintain its pH at about 2.0 for a period of one-quarter to one hour at room temperature (25° C.). After the hydrolysis reaction is complete, a suitable alkali may be added to neutralize the acid before precipitation of the copolymer.

The compounds of items (a) and (b) can be prepared, in accordance with the processes described in copending application Ser. No. 389,872, filed November 2, 1953, by reacting an unsubstituted acrylic acid halide or anhydride or an alpha-hydrocarbon substituted acrylic acid halide or anhydride with a hydrolyzable derivative of a dihydroxyaliphatic amine which yields a dihydroxyaliphatic amine by hydrolysis, in the presence of a strong base and a water-immiscible solvent, at a temperature from —20° C. to +50° C., and preferably —10° C. to +20° C. Any of the monomer compounds disclosed in that application can be used for the preparation of the copolymers of this invention.

The invention will be further illustrated but is not intended to be limited by the following examples wherein the parts stated are parts by weight unless otherwise indicated, and the polymerization initiator (referred to as initiator) is α,α'-azobis(isobutyramidine hydrochloride).

EXAMPLE I

*Copolymerization of 2,2-dimethyl-4,N-methacrylamidomethyl-1,3-dioxolane and methacrylamide*

In a glass flask there was placed 500 parts of distilled water. The temperature was adjusted to 40° C., by means of a water bath and nitrogen gas was passed through the liquid for a period of ½ hour to remove dissolved oxygen. Then, 20 parts of 2,2-dimethyl-4,N-methacrylamidomethyl-1,3-dioxolane (prepared as described in Example I of application Ser. No. 389,872, filed November 2, 1953), 34 parts of methacrylamide and 1/10 part of initiator were added. The introduction of nitrogen gas was continued and polymerization was allowed to proceed for 20 hours. The resulting copolymer solution was acidified to pH 1 to 2 with dilute aqueous hydrochloric acid and allowed to stand at room temperature for one-half hour. The pH of the solution was then adjusted to 6.5 to 7.5 with dilute aqueous sodium hydroxide and the copolymer was coagulated by the addition of an excess of acetone. The coagulated polymer was pulverized and washed with acetone and air dried to yield 35 parts of a white, water-soluble powder, namely, poly-(N,2,3 - dihydroxypropylmethacrylamide co methacrylamide). A 1% aqueous solution of this copolymer at pH 7 and 30° C., had a relative viscosity of 1.73. The addition of a few drops of an aqueous solution of borax containing added sodium hydroxide to a 5% aqueous solution of this copolymer gave rise to the immediate conversion of the liquid to a rigid gel. Acidification of this gel caused it to break down into a free-flowing liquid, and realkalization caused it to be re-formed.

This procedure was repeated with the quantities of materials shown in Table I at 60° C., rather than at 40° C. The yields of the water-soluble copolymer poly-(N - 2,3 - dihydroxypropylmethacrylamide co methacrylamide) which were thus obtained and the relative viscosities of their 1% aqueous solutions thereof, at 30° C., and at pH 7, are given in the Table I.

TABLE I

| Exp. No. | Amt. of Methacrylamide (Parts) | Amt. of 2,2-Dimethyl-N,4-methacrylamidomethyl-1,3-dioxolane (Parts) | Yield of Copolymer (Parts) | Relative Viscosity Of 1% Soln. at 30° C. |
|---|---|---|---|---|
| 1 | 38.3 | 10.0 | 31 | 1.23 |
| 2 | 34.0 | 19.9 | 39 | 1.40 |
| 3 | 29.8 | 29.9 | 40 | 1.44 |
| 4 | 25.5 | 39.8 | 44 | 1.43 |

EXAMPLE II

*Copolymerization of N,2,3-dihydroxypropylmethacrylamide and methacrylamide*

In a glass vessel, there was placed 400 parts of distilled water. The temperature was adjusted to 60° C., by means of a water bath, and a stream of nitrogen gas was passed through the liquid for about ½ hour. Then, a solution of 23.9 parts of N,2,3-dihydroxypropylmethacrylamide in 100 parts of distilled water (prepared by hydrolyzing 29.9 parts of 2,2-dimethyl-4,N-methacrylamidomethyl-1,3-dioxolane dissolved in 100 parts of distilled water, adjusted with dilute aqueous HCl to pH 1 to 2 for ½ hour followed by neutralization with dilute aqueous NaOH to pH 7), 29.8 parts of methacrylamide and 1/20 part of initiator were added. The introduction of nitrogen gas was continued and polymerization was allowed to proceed for 20 hours. The resulting copolymer solution was treated with excess acetone to coagulate the copolymer, which was then pulverized, washed with acetone, and air dried to yield 34 parts of a white, water-soluble powder, namely, poly(N,2,3-dihydroxypropylmethacrylamide co methacrylamide). A 1% aqueous solution of this copolymer at pH 7 and 30° C., had a relative viscosity of 1.56. In the presence of borate ion, solutions of this material are gelled by the addition of alkali and de-gelled by the addition of acid as previously described.

The procedure of this example was repeated with 31.8 parts of N,2,3-dihydroxypropylmethacrylamide and 25.5 parts of methacrylamide to give a yield of 26 parts of poly (N,2,3-dihydroxypropylmethacrylamide co methacrylamide), a 1% aqueous solution of which had a relative viscosity of 1.68 at pH 7 and 30° C.

EXAMPLE III

*Copolymerizations of 2,2-dimethyl-4,N-acrylamidomethyl-1,3-dioxolane and methacrylamide*

In a glass vessel there was placed 500 parts of distilled water. The temperature was adjusted to 40° C., by means of a water bath, and a stream of nitrogen gas was passed through the water over a period of about ½ hour. Then, 18.5 parts of 2,2-dimethyl-4,N-acrylamidomethyl-1,3-dioxolane, 34.0 parts of methacrylamide and 0.1 part of α,α'-azobis(isobutyramidine hydrochloride) were added. The introduction of nitrogen gas was continued and polymerization was allowed to proceed for 20 hours. The resulting copolymer solution was acidified to pH 1 to 2 with dilute aqueous hydrochloric acid and allowed to stand at room temperature for about ½ hour. The solution was then adjusted to pH 7 with dilute aqueous sodium hydroxide, coagulated with excess acetone, and the coagulate was pulverized and washed with acetone and dried to give a yield of 28 parts of poly(N,2,3-dihydroxypropylacrylamide co methacrylamide). A 1% aqueous solution of this copolymer at pH 7 and 30° C., had a relative viscosity of 1.75. The addition of a few drops of a solution of borax containing added sodium hydroxide to a 5% aqueous solution of this copolymer gave rise to the immediate conversion of the liquid to a rigid gel. Acidification of this gel caused it to break down into a free flowing liquid, and re-alkalization caused it to be re-formed.

The procedure of this example was repeated with the use of 48.3 parts of 2,2-dimethyl-4,N-acrylamidomethyl-1,3-dioxolane and 21.3 parts of methacrylamide and there was obtained 35 parts of poly(N,2,3-dihydroxypropylacrylamide co methacrylamide), the viscosity of whose 1% aqueous solution at pH 7 and 30° C., was 1.90. Solutions of this copolymer undergo borate gelling and de-gelling, as described in the previous paragraph.

EXAMPLE IV

*Copolymerization of N,2,3-dihydroxypropylacrylamide and methacrylamide*

In a glass vessel, there was placed 400 parts of distilled water. The temperature was adjusted to 60° C., by means of a water bath, and a steam of nitrogen gas was passed through the liquid for about ½ hour. Then, a solution of 21.8 parts of N,2,3-dihydroxypropylacrylamide in 100 parts of distilled water (prepared by hydrolyzing 28.0 parts of 2,2-dimethyl-4,N-acrylamidomethyl-1,3-dioxolane dissolved in 100 parts of distilled water, adjusted with dilute aqueous HCl to pH 1 to 2, for ½ hour followed by neutralization with dilute aqueous NaOH to pH 7), 29.8 parts of methacrylamide and 0.1 part of initiator were added. The introduction of nitrogen gas was continued and polymerization was allowed to proceed for 20 hours. The resulting copolymer solution was treated with excess acetone to coagulate the copolymer, which was pulverized, washed with acetone, and air dried to yield 28 parts of a white, water-soluble powder, namely, poly(N,2,3-dihydroxypropylacrylamide co methacrylamide). A 1% aqueous solution of this copolymer at pH 7 and 30° C., had a relative viscosity of 1.80. In the presence of borate ion, solutions of this copolymer are gelled by the addition of alkali and de-gelled by the addition of acid as previously described.

EXAMPLE V

*Copolymerization of 2,2,5-trimethyl-5,N-methacrylamido-1,3-dioxane and methacrylamide*

In a glass vessel, there were placed 100 parts of distilled water. The temperature was adjusted to 60° C., by means of a water bath, and a stream of nitrogen gas was passed through the water over a period of about ½ hour. Then, 6.4 parts of 2,2,5-trimethyl-5,N-methacrylamido-1,3-dioxane, 6.0 parts of methacrylamide and 0.01 part of initiator were added. The polymerization was continued for 20 hours and the resulting copolymer solution was then acidified to pH 1 to 2 with dilute aqueous hydrochloric acid, neutralized with dilute aqueous NaOH, coagulated with acetone and dried at 50° C. A yield of 9 parts of poly[N-(1,3-dihydroxy-2-methyl)-isopropylmethacrylamide co methacrylamide] was obtained. The relative viscosity of a 1% aqueous solution of this copolymer at pH 7 and 30° C., was 1.29. Solutions of this copolymer are gelled by alkaline borate and de-gelled by acid as described in Example IV.

EXAMPLE VI

*Copolymerization of 2,2,5-trimethyl-5,N-acrylamido-1,3-dioxane and methacrylamide*

In a glass vessel, there were placed 100 parts of distilled water. The temperature was adjusted to 60° C., by means of a water bath, and a stream of nitrogen gas was passed through the water over a period of about ½ hour to remove dissolved oxygen. Then, 6.3 parts of 2,2,5-trimethyl-5,N-acrylamido-1,3-dioxane, 6.0 parts of methacrylamide and 0.01 part of initiator were added. The polymerization was continued for 20 hours and the resulting copolymer solution was then acidified to pH 1 to 2 with dilute aqueous hydrochloric acid, neutralized with dilute aqueous sodium hydroxide, coagulated with acetone and dried at 50° C. A yield of 7 parts of poly[N-(1,3-dihydroxy-2-methyl)isopropylacrylamide co methacrylamide] was obtained. The relative viscosity of a 1% aqueous solution of this copolymer at pH 7 and 30° C., was 1.47. Borate solutions have the same effect on solutions of this copolymer, as described in Example IV.

EXAMPLE VII

*Copolymerization of N(1,3-dihydroxy-2-methyl)isopropylmethacrylamide and methacrylamide*

In a glass vessel, there were placed 80 parts of distilled water. The temperature was adjusted to 60° C., by means of a water bath, and a stream of nitrogen gas was passed through the water over a period of about ½ hour to remove dissolved oxygen. Then, a solution of 5.2 parts of N(1,3-dihydroxy-2-methyl)isopropylmethacrylamide (prepared by hydrolyzing 2,2,5-trimethyl-5,N-methacrylamido-1,3-dioxane at pH 1 to 2 in 20 parts of water and neutralizing to pH 7, as described in Example II), 6.0 parts of methacrylamide and 0.01 part of initiator were added. The polymerization was continued for 20 hours and the resulting copolymer was coagulated with acetone and dried at 50° C. A yield of 9 parts of poly[N(1,3-dihydroxy-2-methyl)isopropylmethacrylamide co methacrylamide] was obtained, the relative viscosity of whose 1% aqueous solution at pH 7 and 30° C., was 1.20. Again, borate solutions act on this copolymer as described in Example IV.

EXAMPLE VIII

*Copolymerization of N(1,3-dihydroxy-2-methyl)isopropylacrylamide and methacrylamide*

In a glass vessel, there were placed 80 parts of distilled water. The temperature was adjusted to 60° C., by means of a water bath, and a stream of nitrogen gas was passed through the water over a period of about ½ hour. Then, a solution of 5 parts of N(1,3-dihydroxy-2-methyl)isopropylacrylamide (prepared by hydrolyzing 2,2,5-trimethyl-5,N-acrylamido-1,3-dioxane at pH 1 to 2 in 20 parts of water and neutralizing to pH 7, as described in Example II), 6.0 parts of methacrylamide and 0.01 part of initiator were added. Polymerization was continued for 20 hours and the resulting copolymer was coagulated with acetone and dried at 50° C. A yield of 9 parts of poly[N(1,3-dihydroxy-2-methyl)isopropylacrylamide co methacrylamide] was obtained, the relative viscosity of whose 1% aqueous solution at pH 7 and 30° C., was 1.48. Again, borate solution has the same effect on this copolymer as described in Example IV.

EXAMPLE IX

*Copolymerization of 2,2-dimethyl-N,4-methacrylamidomethyl-1,3-dioxolane, methacrylamide and acrylamide*

In a glass vessel, there was placed 500 parts of distilled water. The temperature was adjusted to 60° C., by means of a water bath, and a stream of nitrogen gas was passed through the water over a period of about ½ hour. Then, 19.9 parts of 2,2-dimethyl-N-4-methacrylamidomethyl-1,3-dioxolane, 29.8 parts of methacrylamide, 3.6 parts of acrylamide and 0.1 part of initiator were added. Polymerization was continued for 20 hours, the resulting copolymer solution acidified with dilute aqueous HCl to pH 1 to 2 and allowed to stand at room temperature ½ hour. The solution was then adjusted to pH 7, coagulated by the addition of excess acetone and the copolymer was dried at 50° C. A yield of 29 parts of poly(N-2,3-dihydroxypropylmethacrylamide co methacrylamide co acrylamide) was obtained, the relative viscosity of whose 1% aqueous solution at pH 7 and 30° C., was 1.53.

EXAMPLE X

*Copolymerization of 2,2-dimethyl-N,4-methacrylamidomethyl-1,3-dioxolane, methacrylamide and N,N-dimethylacrylamide*

In a glass vessel, there was placed 500 parts of distilled water. The temperature was adjusted to 60° C., by means of a water bath, and a stream of nitrogen gas was passed through the water over a period of about ½ hour. Then, 39.8 parts of 2,2-dimethyl-N,4-methacrylamido-methyl-1,3-dioxolane, 21.3 parts of methacrylamide, 5.0 parts of N,N-dimethylacrylamide and 0.1 part of initiator were added. Polymerization was continued for 20 hours, the resulted copolymer solution was acidified with dilute HCl to pH 1 to 2 and allowed to stand at room temperature for ½ hour. The solution was adjusted to pH 7 with dilute aqueous NaOH, coagulated by the addition of excess acetone, and the copolymer was dried at 50° C. A yield of 33 parts of poly(N,2,3-dihydroxypropylmethacrylamide co methacrylamide co N,N-dimethylacrylamide) was obtained. The relative viscosity of a 1% aqueous solution of this copolymer at pH 7 and 30° C. was 1.73.

EXAMPLE XI

*Copolymerization of 2,2-dimethyl-N,4-acrylamidomethyl-1,3-dioxolane, methacrylamide and acrylamide*

In a glass vessel, there was placed 500 parts of distilled water. The temperature was adjusted to 60° C. by means of a water bath, and a stream of nitrogen gas was passed through the water over a period of about ½ hour to remove dissolved oxygen. Then, 18.5 parts of 2,2-dimethyl-N,4-acrylamidomethyl-1,3-dioxolane, 29.8 parts of methacrylamide, 3.6 parts of acrylamide and 0.1 part of initiator were added. Polymerization was continued for 20 hours, the resulting copolymer solution acidified to pH 1 to 2 with dilute HCl and allowed to stand at room temperature ½ hour. The solution was then adjusted to pH 7 with dilute aqueous NaOH, coagulated by the addition of acetone and the copolymer was dried at 50° C. A yield of 22 parts of the white, water-soluble poly(N-2,3-dihydroxypropylacrylamide co methacrylamide co acrylamide) was obtained, the relative viscosity of whose 1% aqueous solution at pH 7 and 30° C., was 1.65.

EXAMPLE XII

*Copolymerization of 2,2-dimethyl-N,4-acrylamidomethyl-1,3-dioxolane, methacrylamide and N,N-dimethylacrylamide*

In a glass vessel, there were placed 500 parts of distilled water. The temperature was adjusted to 60° C., by means of a water bath, and a stream of nitrogen gas was passed through the water for a period of about ½ hour. Then, 37.0 parts of 2,2-dimethyl-N,4-acrylamidomethyl-1,3-dioxolane, 21.3 parts of methacrylamide, 5.0 parts of N,N-dimethylacrylamide and 0.1 part of initiator were added. Polymerization was continued for 20 hours, the resulting copolymer solution was acidified to pH 1 to 2 with dilute HCl and allowed to stand at room temperature for ½ hour. The solution was then adjusted to pH 7 with dilute aqueous NaOH, coagulated by the addition of excess acetone, and the white, water-soluble copolymer was dried at 50° C. A yield of 21 parts of poly(N,2,3-dihydroxypropylacrylamide co methacrylamide co N,N-dimethylacrylamide) was obtained. The relative viscosity of a 1% aqueous solution of this material at pH 7 and 30° C., was 1.69.

EXAMPLE XIII

*Copolymerization of N,2,3-dihydroxypropylacrylamide, methacrylamide and acrylamide*

In a glass vessel, there was placed 400 parts of distilled water. The temperature was adjusted to 60° C., by means of a water bath, and a stream of nitrogen gas was passed through the water for a period of about ½ hour to remove the dissolved oxygen. Then, a solution of 21.8 parts of N,2,3-dihydroxypropylacrylamide in 100 parts of water (prepared by hydrolyzing 28.0 parts of 2,2-dimethyl-4,N-acrylamidomethyl-1,3-dioxolane dissolved in 100 parts of distilled water at pH 1 to 2 for ½ hour followed by neutralization to pH 7, as described in Example II), 25.5 parts of methacrylamide, 3.6 parts of acrylamide and 0.1 part of initiator were added. The introduction of nitrogen gas was continued and polymerization was allowed to proceed for 20 hours. The resulting copolymer solution was treated with excess acetone to coagulate the copolymer, which was then pulverized, washed with acetone, and dried to yield 28 parts of a white, water-soluble copolymer, namely, poly(N,2,3-dihydroxypropylacrylamide co methacrylamide co acrylamide). A 1% aqueous solution of this three-component copolymer at pH 7 and 30° C., had a relative viscosity of 2.11.

EXAMPLE XIV

*Copolymerization of N,2,3-dihydroxypropylmethacrylamide, methacrylamide and acrylamide*

In a glass vessel, there was placed 400 parts of distilled water. The temperature was adjusted to 60° C., by means of a water bath, and the stream of nitrogen gas was passed through the water for a period of about ½ hour. Then, 23.9 parts of N,2,3-dihydroxypropylmethacrylamide (prepared by hydrolyzing 30.0 parts of 2,2-dimethyl-4,N-methacrylamidomethyl-1,3-dioxolane dissolved in 100 parts of distilled water at pH 1 to 2 for ½ hour followed by neutralization to pH 7, as described in Example II), 25.5 parts of methacrylamide, 3.6 parts of acrylamide and 0.1 part of initiator were added. The introduction of nitrogen gas was continued and the polymerization was allowed to proceed for 20 hours. The resulting copolymer solution was treated with excess acetone to coagulate the copolymer, which was pulverized, washed with acetone, and air-dried to yield 44 parts of a white, water-soluble powder, namely, the 3-component copolymer poly(N,2,3-dihydroxypropylmethacrylamide co methacrylamide co acrylamide). The relative viscosity of a 1% aqueous solution of this copolymer at pH 7 and 30° C. was 1.45.

EXAMPLE XV

*Copolymerization of N,2,3-dihydroxypropylmethacrylamide, methacrylamide and N,N-dimethylacrylamide*

In a glass vessel, there was placed 400 parts of distilled water. The temperature was adjusted to 60° C., by means of water bath, and a stream of nitrogen gas was passed through the water for a period of about ½ hour. Then, a solution of 23.9 parts of N,2,3-dihydroxypropylmethacrylamide (prepared by hydrolyzing 30.0 parts of 2,2-dimethyl - 4,N - methacrylamidomethyl - 1,3 - dioxolane dissolved in 100 parts of distilled water in pH 1 to 2 for ½ hour followed by neutralization to pH 7, as described in Example II), 21.3 parts of methacrylamide, 9.9 parts of N,N-dimethylacrylamide and 0.1 part of initiator were added. The introduction of nitrogen gas was continued and polymerization was allowed to proceed for 20 hours. The resulting three-component copolymer solution was treated with an excess acetone to coagulate the polymer, which was pulverized, washed with acetone, and air-dried to yield 44 parts of a white, water-soluble, powder, namely, poly(N,2,3 - dihydroxypropylmethacrylamide co methacrylamide co N,N-dimethylacrylamide). A 1% aqueous solution of this copolymer at pH 7 and 30° C., had a relative viscosity of 1.88.

EXAMPLE XVI

*Copolymerization of 2,2-dimethyl-N,4-methacrylamidomethyl-1,3-dioxolane and acrylamide*

In a glass vessel, there was placed 500 parts of distilled water, and the temperature was adjusted to 60° C., by means of a water bath. Nitrogen gas was passed through the liquid for a period of ½ hour. Then, 50.0 parts of 2,2 - dimethyl - N,4 - methacrylamidomethyl - 1,3 - dioxolane, 18.0 parts of acrylamide and 0.1 part of initiator were added. The introduction of nitrogen gas was continued and polymerization was allowed to proceed for 20 hours. The resulting copolymer solution was acidified to pH 1 to 2 with dilute hydrochloric acid and allowed to stand at room temperature for ½ hour. The pH of the solution was then adjusted to 7.0 with dilute aqueous NaOH and the copolymer was coagulated by the addition of an excess of acetone. The coagulated copolymer was pulverized, washed with acetone and air-dried to yield 47 parts of a white, water-soluble powder, namely, poly-(N,2,3-dihydroxypropylmethacrylamide co acrylamide). A 1% aqueous solution of this copolymer at pH 7 and 30° C., had a relative viscosity of 1.88.

EXAMPLE XVII

*Copolymerization of 2,2-dimethyl-N,4-methacrylamidomethyl-1,3-dioxolane and N,N-dimethylacrylamide*

In a glass vessel, there was placed 500 parts of distilled water. The temperature was adjusted to 60° C., by means of a water bath and nitrogen gas was passed through the liquid for a period of ½ hour. Then, 49.8 parts of 2,2-dimethyl-N,4-methacrylamidomethyl-1,3-dioxolane, 24.8 parts of N,N-dimethylacrylamide and 0.1 part of initiator were added. The introduction of nitrogen gas was continued and polymerization was allowed to proceed for 20 hours. The resulting copolymer solution was acidified to pH 1 to 2 with dilute hydrochloric acid and allowed to stand at room temperature for ½ hour. The pH of the solution was then adjusted to 7.0 with dilute aqueous sodium hydroxide and the copolymer was coagulated by the addition of an excess of an acetone. The coagulated polymer was pulverized, washed with acetone, and air dried to yield 36 parts of a white water-soluble powder, namely, poly(N,2,3-dihydroxypropylmethacrylamide co N,N-dimethylacrylamide). A 1% aqueous solution of this copolymer at pH 7 and 30° C., had a relative viscosity of 1.72.

EXAMPLE XVIII

*Copolymerization of N,2,3-dihydroxypropylmethacrylamide and acrylamide*

In a glass vessel, there was placed 400 parts of distilled water. The temperature was adjusted to 50° C., by means of a water bath. Nitrogen gas is passed through the liquid for a period of ½ hour. Then, a solution of 40.0 parts of N,2,3-dihydroxypropylmethacrylamide in 100 parts of water (prepared by hydrolyzing 50 parts of 2,2-dimethyl-N,4-methacrylamidomethyl-1,3-dioxolane at pH 1 to 2 for about ½ hour followed by neutralization to pH 7, as described in Example II), 18.0 parts of acrylamide and 0.1 part of initiator were added. The introduction of nitrogen gas was continued and polymerization was allowed to proceed 20 hours. The resulting copolymer solution was treated with excess acetone to coagulate the copolymer, which was pulverized and washed with acetone, and air-dried to yield 53 parts of a white, water-soluble powder, namely, poly(N,2,3-dihydroxypropylmethacrylamide co acrylamide). A 1% aqueous solution of this copolymer at a pH 7 and 30° C., had a relative viscosity of 2.51.

EXAMPLE XIX

*Copolymerization of N,2,3-dihydroxypropylmethacrylamide and N,N-dimethylacrylamide*

In a glass vessel, there was placed 400 parts of water. The temperature was adjusted to 50° C., by means of a water bath, and nitrogen gas was passed through the solution for a period of about ½ hour. Then, a solution of 39.9 parts of N,2,3-dihydroxypropylmethacrylamide (prepared by hydrolysis of 49.8 parts of 2,2-dimethyl-4,N-methacrylamidomethyl-1,3-dioxolane in 100 parts of water, as described in Example II), 24.8 parts of N,N-dimethylacrylamide and 0.1 part of initiator were added. The introduction of nitrogen was continued and polymerization was allowed to proceed for 20 hours. Excess acetone was added to the copolymer solution, which treatment caused coagulation of the copolymer. This substance was then pulverized, and washed with acetone and dried to yield 54 parts of the white, water-soluble powder, namely, poly(N,2,3-dihydroxypropylmethacrylamide co N,N-dimethylacrylamide). The relative viscosity of a one percent solution of this copolymer at pH 7 and 30° C., was 2.77.

In place of the acrylamides used in the foregoing examples, there may be substituted other amides of general Formula II. Among such suitable amides are ethacrylamide, propacrylamide, cyclohexacrylamide, N-methylmethacrylamide, N-isopropylmethacrylamide, N-phenylacrylamide, N-isopropylacrylamide, N-phenylmethacrylamide, N,N-diethylacrylamide, N-methyl-N-ethylacrylamide, etc.

Similarly, in place of the specific ethylenically unsaturated compounds of Formula I, or their hydrolyzable acetal derivatives described in the foregoing examples, there may be used one or more other compounds of such formula, or their acetal derivatives. Suitable compounds are disclosed in copending application Ser. No. 389,872, and any of them can be used, e. g., 4(N,4-methacrylamidobutyl)-2,2-dimethyl-1,3-dioxolane, N-5,6-dihydroxyhexylmethacrylamide.

In place of the polymerization initiator used in the foregoing examples, one may substitute one or more other initiators. Among the suitable ones are: benzoyl peroxide, tertiary butyl peroxide, tertiary butyl hydroperoxide, acetyl peroxide, cumene hydroperoxide, hydrogen peroxide, sodium peroxide, sodium perborate, and sodium persulfate; ammonium persulfate-sodium bisulfite, hydrogen peroxide-thiourea, and potassium persulfate-ferrous sulfate; and α,α'-azobis (isobutyronitrile), α,α'-azobis (α,γ-dimethylvaleronitrile), α,α'-azobis (α,γ,γ-trimethylvaleronitrile), and α,α'-azobis (α-methylbutyronitrile).

The copolymers of this invention are quite soluble in water and water-alcohol mixtures. When admixed with alkaline solutions containing borate ions the copolymers form cross-linked gels. In acidic solutions the copolymers do not gel but remain in water or water-alcohol solution. By treating the borate-gels with an acidic solution the cross-linkages are broken and the soluble original copolymers reformed by a de-gelling action. This gelling and de-gelling action may be repeated many times with no degradation of the polymer chain.

The gelling and de-gelling action, it is believed, is produced by virtue of the formation of complex compounds between borate ion and polyhydroxy compounds in which boron has a coordination number of 4. The bridges, or cross-links, which are formed between borate ion and our new polymers in alkaline solutions may be represented as follows:

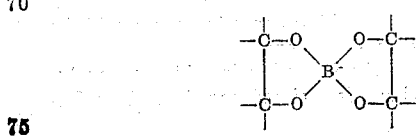

with an α-glycol-containing polymer, or

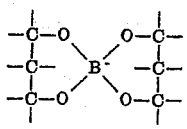

with a β-glycol-containing polymer.

The destruction of these cross-links in acidic solutions results, it is believed, because the borate is converted into a substituted boric acid in which boron has a coordination number of 3, and which may be represented as follows:

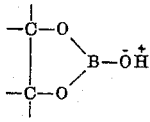

or

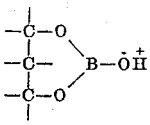

The copolymers of this invention can be used for the preparation of water-permeable colloid layers of photographic films, plates and papers, including not only silver halide layers but light-insensitive layers such as filter-layers, antihalation layers and anti-static or antiabrasion layers. For these purposes, suitable dyes, pigments, and anti-static agents, etc. may be admixed therewith.

Suitable gelling agents for the polymers include boric acid, sodium and potassium tetraborate, metaborate, and orthoborate, glyceryl borate; the sorbitol, mannitol, and dulcitol monoborates and diborates and mono- and polycondensation products and their sodium and ammonium salts set forth in Examples 1 to 19 of United States Patent 2,223,349 and Examples 3, 4, 5, 7, 9, 14, and 18 to 35 of United States Patent 2,223,948.

An advantage of this invention is that it provides a new class of water-permeable colloids which are useful as superior replacements for gelatin. Another advantage is that that it provides new colloids which combine the advantageous properties of gelatin and polyvinyl alcohol, without the need for the temperature controlled setting of the former. The copolymers, moreover, are uniform in character and thus have advantages over gelatin. A major advantage resides in the fact that the copolymers can be gelled, de-gelled, and re-gelled in a reversible and easily controllable fashion without dependence upon temperature changes.

Another important advantage of the new copolymers provided by the invention resides in the fact that the copolymers remain in solution in water or water-alcohol mixtures after admixture with water-soluble silver salts and water-soluble chlorides, bromides, or iodides during precipitation of silver halides in the copolymers which act as colloid boinding agents. After the coated layers are set or gelled by means of borate gelling agents they are strong, coherent and adherent to gelatin sublayers, and yet are freely permeable on film base to developing, fixing, bleaching, and washing solutions and are free from the disadvantages of gelatin silver halide layers, including non-uniformity and being subject to the deleterious action of molds and bacteria. Still other advantages will be apparent to those skilled in the art.

The embodiments of the invention in which an exclutive property or privilege is claimed are defined as follows:

1. A copolymer consisting of recurring intralinear units of the formula:

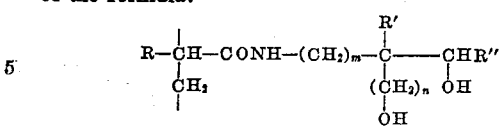

and

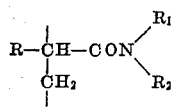

wherein R is a member taken from the group consisting of hydrogen, alkyl of 1 to 3 carbon atoms, phenyl and cyclohexyl, R' and R" are members taken from the group consisting of hydrogen and alkyl of 1 to 3 carbon atoms, $m$ is a cardinal number taken from the group consisting of 0, 1, 2, 3, and 4, $n$ is a cardinal number taken from the group consisting of 0 and 1, $R_1$ and $R_2$ are members taken from the group consisting of hydrogen, alkyl of 1 to 3 carbon atoms, phenyl and cyclohexyl and further characterized in that the NH group and any hydroxyl groups are spaced by at least two carbon atoms, said first unit constituting 10 to 70 mol percent of the copolymer, said coplymer being soluble in water and capable of being gelled in aqueous alkaline solutions by means of borate ions.

2. A linear poly(N,2,3-dihydroxypropylmethacrylamide co methacrylamide) wherein the first component constitutes 10 to 70 mol percent and the second constitutes 90 to 30 mol percent of the copolymer, said copolymer being soluble in water and capable of being gelled in aqueous alkaline solutions by means of borate ions.

3. A linear poly(N,2,3-dihydroxypropylacrylamide co methacrylamide) wherein the first component constitutes 10 to 70 mol percent and the second constitutes 90 to 30 mol percent of the copolymer, said copolymer being soluble in water and capable of being gelled in aqueous alkaline solutions by means of borate ions.

4. A linear poly(N,1,3-dihydroxy-2-methylisopropylmethacrylamide co methacrylamide) wherein the first component constitutes 10 to 70 mol percent and the second constitutes 90 to 30 mol percent of the copolymer, said copolymer being soluble in water and capable of being gelled in aqueous alkaline solutions by means of borate ions.

5. A linear poly(N,1,3-dihydroxy-2-methylisopropylacrylamide co methacrylamide) wherein the first component constitutes 10 to 70 mol percent and the second constitutes 90 to 30 mol percent of the copolymer, said copolymer being soluble in water and capable of being gelled in aqueous alkaline solutions by means of borate ions.

6. A linear poly(N,2,3-dihydroxypropylmethacrylamide co methacrylamide co acrylamide) wherein the first component constitutes 10 to 70 mol percent and the second constitues 90 to 30 mol percent of the copolymer, said copolymer being soluble in water and capable of being gelled in aqueous alkaline solutions by means of borate ions.

7. The process which comprises copolymerizing a mixture comprising 10 to 70 mol percent of a compound of the general formula:

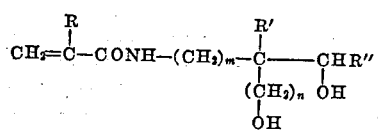

and 90 to 30 mol percent of a compound of the general formula:

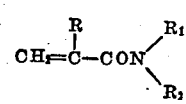

wherein R is a member taken from the group consisting of hydrogen, alkyl of 1 to 3 carbon atoms, phenyl and cyclohexyl, R' and R" are members taken from the group consisting of hydrogen and alkyl of 1 to 3 carbon atoms, $m$ is a cardinal number taken from the group consisting of 0, 1, 2, 3, and 4, $n$ is a cardinal number taken from the group consisting of 0 and 1, $R_1$ and $R_2$ are members taken from the group consisting of hydrogen, alkyl of 1 to 3 carton atoms, phenyl and cyclohexyl and further characterized in that the NH group and any hydroxyl groups are spaced by at least two carbon atoms.

8. The process which comprises copolymerizing at a temperature between 40° and 70° C. for a period of 1 to 50 hours and in the presence of a polymerization initiator 10 to 70 mol percent of a compound of the general formula:

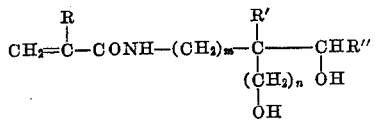

and 90 to 30 mol percent of a compound of the general formula:

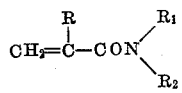

wherein R is a member taken from the group consisting of hydrogen, alkyl of 1 to 3 carbon atoms, phenyl and cyclohexyl, R' and R" are members taken from the group consisting of hydrogen and alkyl of 1 to 3 carbon atoms, $m$ is a cardinal number taken from the group consisting of 0, 1, 2, 3, and 4, $n$ is a cardinal number taken from the group consisting of 0 and 1, $R_1$ and $R_2$ are members taken from the group consisting of hydrogen, alkyl of 1 to 3 carbon atoms, phenyl and cyclohexyl and further characterized in that the NH group and any hydroxyl groups are spaced by at least two carbon atoms.

9. The process which comprises copolymerizing at a temperature between 40° C. and 70° C. for a period of 1 to 50 hours and in the presence of a polymerization initiator N,2,3-dihydroxypropylmethacrylamide and methacrylamide in the proportions of 10 to 70 mol percent of the former to 90 to 30 mol percent of the latter.

10. The process which comprises copolymerizing at a temperature between 40° C. and 70° C. for a period of 1 to 50 hours and in the presence of a polymerization initiator N,2,3-dihydroxypropylacrylamide and methacrylamide in the proportions of 10 to 70 mol percent of the former to 90 to 30 mol percent of the latter.

11. The process which comprises copolymerizing at a temperature between 40° C. and 70° C. for a period of 1 to 50 hours and in the presence of a polymerization initiator N,1,3-dihydroxy-2-methylisopropylmethacrylamide and methacrylamide in the proportions of 10 to 70 mol percent of the former to 90 to 30 mol percent of the latter.

12. The process which comprises copolymerizing at a temperature between 40° C. and 70° C. for a period of 1 to 50 hours and in the presence of a polymerization initiator N,1,3 - dihydroxy - 2 - methylisopropylacrylamide and methacrylamide in the proportions of 10 to 70 mol percent of the former to 90 to 30 mol percent of the latter.

References Cited in the file of this patent

FOREIGN PATENTS 495,934     Canada _____ Sept. 8, 1953

OTHER REFERENCES

Report on Nomenclature, Journal of Polymer Science, volume 8, Number 3, pages 257 to 277.

UNITED STATES PATENT OFFICE
CERTIFICATE OF CORRECTION

Patent No. 2,830,972 April 15, 1958

Comer Drake Shacklett

It is hereby certified that error appears in the printed specification of the above numbered patent requiring correction and that the said Letters Patent should read as corrected below.

Column 1, line 69, for "carinal" read --cardinal--; column 2, line 4 for "to type" read --of type--; column 5, line 24, for "steam" read --stream--.

Signed and sealed this 15th day of July 1958.

(SEAL)
Attest:
KARL H. AXLINE

Attesting Officer

ROBERT C. WATSO
Commissioner of Pate